United States Patent
Ohta et al.

(10) Patent No.: US 10,720,646 B2
(45) Date of Patent: Jul. 21, 2020

(54) NON AQUEOUS ELECTROLYTE BATTERY BINDER COMPOSITION, AND NON AQUEOUS ELECTROLYTE BATTERY SLURRY COMPOSITION, NON AQUEOUS ELECTROLYTE BATTERY NEGATIVE ELECTRODE, AND NON AQUEOUS ELECTROLYTE BATTERY USING SAME

(71) Applicant: Kuraray Co., Ltd., Kurashiki-shi (JP)

(72) Inventors: Yuki Ohta, Okayama (JP); Toshimitsu Tanaka, Okayama (JP); Junji Fujioka, Okayama (JP); Jun-Sang Cho, Okayama (JP); Hideharu Iwasaki, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 151 days.

(21) Appl. No.: 15/750,632

(22) PCT Filed: Aug. 9, 2016

(86) PCT No.: PCT/JP2016/073405
§ 371 (c)(1),
(2) Date: Feb. 6, 2018

(87) PCT Pub. No.: WO2017/026475
PCT Pub. Date: Feb. 16, 2017

(65) Prior Publication Data
US 2019/0273259 A1 Sep. 5, 2019

(30) Foreign Application Priority Data

Aug. 10, 2015 (JP) ................................. 2015-158268

(51) Int. Cl.
| | |
|---|---|
| *H01M 4/62* | (2006.01) |
| *C08L 23/02* | (2006.01) |
| *C08L 35/02* | (2006.01) |
| *C08K 5/17* | (2006.01) |
| *H01M 4/13* | (2010.01) |
| *C08K 3/20* | (2006.01) |
| *H01M 4/139* | (2010.01) |
| *C08L 23/26* | (2006.01) |
| *H01M 4/02* | (2006.01) |

(52) U.S. Cl.
CPC .............. *H01M 4/622* (2013.01); *C08K 3/20* (2013.01); *C08K 5/17* (2013.01); *C08L 23/025* (2013.01); *C08L 23/26* (2013.01); *C08L 35/02* (2013.01); *H01M 4/13* (2013.01); *H01M 4/139* (2013.01); *H01M 4/62* (2013.01); *C08L 2203/20* (2013.01); *H01M 2004/027* (2013.01)

(58) Field of Classification Search
None
See application file for complete search history.

(56) References Cited

U.S. PATENT DOCUMENTS

| | | |
|---|---|---|
| 4,389,513 A | 6/1983 | Miyazaki |
| 2005/0095503 A1 | 5/2005 | Adachi et al. |
| 2007/0292618 A1 | 12/2007 | Srinivasan et al. |
| 2007/0292619 A1 | 12/2007 | Srinivasan et al. |
| 2009/0325069 A1 | 12/2009 | Anada et al. |
| 2010/0029160 A1 | 2/2010 | Srinivasan et al. |
| 2011/0165398 A1 | 7/2011 | Shoemake et al. |
| 2012/0064323 A1 | 3/2012 | Shoemake et al. |
| 2012/0183723 A1 | 7/2012 | Srinivasan et al. |
| 2012/0252937 A1 | 10/2012 | Cannon et al. |
| 2014/0087250 A1 | 3/2014 | Coowar et al. |
| 2014/0131630 A1 | 5/2014 | Hwang et al. |
| 2015/0243993 A1* | 8/2015 | Kang .................... H01M 4/622 429/217 |

FOREIGN PATENT DOCUMENTS

| | | |
|---|---|---|
| CN | 104136540 A | 11/2014 |
| JP | 57-14679 A | 1/1982 |
| JP | 60-56724 A | 4/1985 |
| JP | 2000-67917 A | 3/2000 |
| JP | 2006-161003 A | 6/2006 |
| JP | 2008-288214 A | 11/2008 |
| JP | 2010-9940 A | 1/2010 |
| JP | 2011-210502 A | 10/2011 |
| JP | 2014-13693 A | 1/2014 |
| JP | 2014-510362 A | 4/2014 |
| JP | 2014-98151 A | 5/2014 |
| JP | 2015-128006 A | 7/2015 |
| JP | 2 01 5-1 51 4 | 8/2015 |
| KR | 10-2007-0107008 A | 11/2007 |
| WO | WO 2005/014698 A1 | 2/2005 |
| WO | 2008/029502 A1 | 3/2008 |
| WO | 2014/010866 A1 | 1/2014 |
| WO | WO 2016/067843 A1 | 5/2016 |

OTHER PUBLICATIONS

Miyazaki (JPS 5714679) (a raw machine translation) (Abstract) (Jan. 25, 1982) (Year: 1982).*
Miyazaki (JPS 5714679) (a raw machine translation) (Detailed Description) (Jan. 25, 1982) (Year: 1982).*
International Search Report dated Oct. 4, 2016, in PCT/JP2016/073405, filed Aug. 9, 2016.
Office Action dated Jan. 31, 2017; in Japanese patent application No. 2016-567956 (with English translation), 7 pages.
Office Action dated Sep. 14, 2017, in Taiwanese patent application No. 105125232 (with English Summary), 7 pages.
Extended European Search Report dated Nov. 29, 2018 in corresponding European Patent Application No. 16835172.4, 9 pages.

(Continued)

*Primary Examiner* — Carmen V Lyles-Irving
(74) *Attorney, Agent, or Firm* — Oblon, McClelland, Maier & Neustadt, L.L.P.

(57) ABSTRACT

The present invention pertains to: a non aqueous electrolyte battery binder composition containing a polyamine and a neutralized salt of an α-olefin-maleic acid copolymer obtained through copolymerization of an α-olefin and maleic acid; and a non aqueous electrolyte battery slurry composition, a non aqueous electrolyte battery negative electrode, and a non aqueous electrolyte battery, etc., using the non aqueous electrolyte battery binder composition.

4 Claims, No Drawings

(56) References Cited

OTHER PUBLICATIONS

Office Action dated Dec. 3, 2019 in Korean Patent Application No. 10-2018-7006775 (with unedited computer generated English translation), 7 pages.
Office Action dated Apr. 8, 2020 in Chinese Patent Application No. 201680047011.2 with English Summary of the Office Action, 7 pages.

* cited by examiner

NON AQUEOUS ELECTROLYTE BATTERY BINDER COMPOSITION, AND NON AQUEOUS ELECTROLYTE BATTERY SLURRY COMPOSITION, NON AQUEOUS ELECTROLYTE BATTERY NEGATIVE ELECTRODE, AND NON AQUEOUS ELECTROLYTE BATTERY USING SAME

TECHNICAL FIELD

The present invention relates to a nonaqueous electrolyte battery binder composition, and a non aqueous electrolyte battery slurry composition, a non aqueous electrolyte battery negative electrode, and a non aqueous electrolyte battery using the same.

BACKGROUND ART

In recent years, prevalence of portable terminals such as a portable phone, a notebook type personal computer, and a pad type information terminal apparatus is considerable. A lithium ion secondary battery is used as a secondary battery that is used as a power source for these portable terminals. Since a more comfortable portability is demanded in the portable terminals, scale reduction, thickness reduction, weight reduction, and performance enhancement of the portable terminals are rapidly developing, and the portable terminals are coming to be used in various fields. This trend is currently still continuing, and further scale reduction, thickness reduction, weight reduction, and performance enhancement of batteries used in the portable terminals are also demanded.

A non aqueous electrolyte battery such as a lithium ion secondary battery has a structure such that a positive electrode and a negative electrode are disposed via a separator and housed in a container together with an electrolytic solution obtained by dissolving a lithium salt such as $LiPF_6$, $LiBF_4$, LiTFSI (lithium (bistrifluoromethylsulfonylimide)), or LiFSI (lithium (bisfluorosulfonylimide)) into an organic liquid such as ethylene carbonate.

Typically, the negative electrode and the positive electrode are formed in such a manner that a slurry for electrodes, which is obtained by dissolving or dispersing a binder and a thickening agent into water and mixing the resulting material with an active material, an electroconductive auxiliary agent (electroconductivity imparting agent) that is added in accordance with the needs, and the like (the slurry for electrodes may hereafter simply referred to as a slurry), is applied onto a current collector, followed by drying water to bind as a mixed layer. More specifically, for example, the negative electrode is formed in such a manner that a carbonaceous material serving as an active material capable of intercalating and deintercalating lithium ions, acetylene black serving as an electroconductive auxiliary agent added in accordance with the needs, and the like are bound with each other onto a current collector such as copper with use of a binder for secondary battery electrodes. On the other hand, the positive electrode is formed in such a manner that $LiCoO_2$ or the like serving as an active material, an electroconductive auxiliary agent that is similar to that of the negative electrode and added in accordance with the needs, and the like are bound with each other onto a current collector such as aluminum with use of a binder for secondary battery electrodes.

Hereto, diene-based rubbers such as styrene-butadiene rubber and acrylic series such as polyacrylic acid are used as a binder for an aqueous medium (for example, Patent Literatures 1 and 2). Examples of the thickening agent include methyl cellulose, ethyl cellulose, hydroxyethyl cellulose, hydroxypropoxycellulose, carboxymethyl cellulose. sodium salt (CMC—Na), and sodium polyacrylate. Among these, CMC—Na is often used (for example, Patent Literature 3).

However, diene-based rubbers such as styrene-butadiene rubber have a low adhesion property to a metal current collector electrode such as copper, raising a problem in that the amount of use cannot be reduced in order to enhance the close adhesion between the current collector electrode and the electrode material. Also, there is a problem in that the diene-based rubbers are vulnerable to the heat generated at the time of charging/discharging, and have a low capacity retention ratio. On the other hand, sodium polyacrylate exhibits a higher adhesion property than the styrene-butadiene rubber series; however, there is a problem in that the electric resistance is high, and also the electrode becomes hard to lack in toughness, so that the electrode is liable to be split. Recently, there is an increasing demand for extension of the time for use of portable terminals and reduction of the charging time, and accordingly, capacity increase (reduction of resistance) of the battery, and improvement in the lifetime (cycle characteristics) and charging speed (rate characteristics) are becoming imperative, so that this is particularly a hindrance.

In non aqueous electrolyte batteries, the battery capacity is influenced by the amount of the active material, so that, in order to increase the amount of the active material in a limited space of the battery, it is effective to suppress the amount of the binder and the thickening agent. Also, the rate characteristics are influenced by the easiness of electron movement, so that it is effective to suppress the amount of the binder and the thickening agent that are non-electroconductive and hinder the movement of the electrons. However, when the amount of the binder and the thickening agent is reduced, the binding property between the current collector electrode and the electrode material and between the active materials in the electrode decreases, so that the durability (battery life) against use for a long period of time considerably decreases, and moreover, the electrode becomes brittle. In this manner, it has been so far difficult to achieve an improvement in the battery characteristics such as battery capacity while keeping the binding property between the current collector electrode and the electrode material and keeping the toughness as the electrode.

The present invention has been made in view of the aforementioned circumstances, and an object thereof is to improve the battery characteristics in the non aqueous electrolyte batteries without deteriorating the function as the binder, that is, the binding property between the active materials and to the current collector electrode and the toughness as the electrode.

CITATION LIST

Patent Literature

Patent Literature 1: Japanese Unexamined Patent Publication No. 2000-67917

Patent Literature 2: Japanese Unexamined Patent Publication No. 2008-288214

Patent Literature 3: Japanese Unexamined Patent Publication No. 2014-13693

SUMMARY OF INVENTION

The present inventors have made eager researches in order to solve the aforementioned problems and, as a result, have found out that the aforementioned object can be achieved by using a binder composition for non aqueous electrolyte batteries that has the following constitution. Based on this finding, the present inventors have made further studies and have thereby completed the present invention.

That is, a non aqueous electrolyte battery binder composition (which may hereafter be simply referred to as a binder composition) according to one aspect of the present invention is characterized by containing a polyamine and a neutralized salt of an α-olefin-maleic acid copolymer in which an α-olefin and a maleic acid are copolymerized.

According to the present invention, a non aqueous electrolyte battery binder composition that is provided with a binding property and toughness can be obtained, and further an improvement in the battery characteristics of non aqueous electrolyte batteries can be realized by using the electrode binder composition.

DESCRIPTION OF EMBODIMENTS

Hereafter, the embodiments of the present invention will be described in detail; however, the present invention is not limited to these alone.

The non aqueous electrolyte battery binder composition according to the present embodiment is characterized by containing a polyamine and a neutralized salt of an α-olefin-maleic acid copolymer in which an α-olefin and a maleic acid are copolymerized.

In the present embodiment, the α-olefin-maleic acid copolymer in which an α-olefin and a maleic acid are copolymerized is composed of a unit (A) based on the α-olefin and a unit (B) based on the maleic acid, and it is preferable that the components of (A) and (B) satisfy (A)/(B)=1/1 to 1/3 (molar ratio). Further, the α-olefin-maleic acid copolymer is preferably a linear random copolymer having an average molecular weight of 10,000 to 500,000.

In the present embodiment, the unit (A) based on the α-olefin refers to a structure represented by the general formula —$CH_2CR^1R^2$— (in the formula, $R^1$ and $R^2$ may be the same or different from each other, and each represent hydrogen or an alkyl group or an alkenyl group having a carbon number of 1 to 10). Also, the α-olefin used in the present embodiment is a straight-chain or branched olefin having a carbon-carbon unsaturated double bond at the α position. In particular, the α-olefin is preferably an olefin having a carbon number of 2 to 12, particularly 2 to 8. Typical examples of the α-olefin that can be used include ethylene, propylene, n-butylene, isobutylene, n-pentene, isoprene, 2-methyl-1-butene, 3-methyl-1-butene, n-hexene, 2-methyl-1-pentene, 3-methyl-1-pentene, 4-methyl-1-pentene, 2-ethyl-1-butene, 1,3-pentadiene, 1,3-hexadiene, 2,3-dimethylbutadiene, 2,5-pentadiene, 1,4-hexadiene, 2,2,4-trimethyl-1-pentene, and others. Among these, in particular, the α-olefin is preferably isobutylene in view of availability, polymerizability, and stability of the product. The term isobutylene is meant to include a mixture containing isobutylene as a major component, for example, a BB fraction (C4 fraction). These α-olefins may be used alone or in combination of two or more kinds thereof.

In the present embodiment, preferable examples of the unit (B) based on the maleic acid include maleic anhydride derivatives such as maleic anhydride, maleic acid, maleic acid monoesters (for example, methyl maleate, ethyl maleate, propyl maleate, phenyl maleate, and the like), maleic acid diesters (for example, dimethyl maleate, diethyl maleate, dipropyl maleate, diphenyl maleate, and the like), maleimide and N-substituted derivatives thereof (for example, N-substituted alkylmaleimides such as maleimide, N-methylmaleimide, N-ethylmaleimide, N-propylmaleimide, N-n-butylmaleimide, N-t-butylmaleimide, and N-cyclohexylmaleimide, N-substituted alkylphenylmaleimides such as N-phenylmaleimide, N-methylphenylmaleimide, and N-ethylphenylmaleimide, and N-substituted alkoxyphenylmaleimides such as N-methoxyphenylmaleimide and N-ethoxyphenylmaleimide), and further, halides of these (for example, N-chlorophenylmaleimide), citraconic anhydride derivatives such as citraconic anhydride, citraconic acid, citraconic acid monoesters (for example, methyl citraconate, ethyl citraconate, propyl citraconate, phenyl citraconate, and the like), citraconic acid diesters (for example, dimethyl citraconate, diethyl citraconate, dipropyl citraconate, diphenyl citraconate, and the like), citraconimide and N-substituted derivatives thereof (for example, N-substituted alkylmaleimides such as citraconimide, 2-methyl-N-methylmaleimide, 2-methyl-N-ethylmaleimide, 2-methyl-N-propylmaleimide, 2-methyl-N-n-butylmaleimide, 2-methyl-N-t-butylmaleimide, and 2-methyl-N-cyclohexylmaleimide, 2-methyl-N-substituted alkylphenylmaleimides such as 2-methyl-N-phenylmaleimide, 2-methyl-N-methylphenylmaleimide, and 2-methyl-N-ethylphenylmaleimide, and 2-methyl-N-substituted alkoxyphenylmaleimides such as 2-methyl-N-methoxyphenylmaleimide and 2-methyl-N-ethoxyphenylmaleimide), and further, halides of these (for example, 2-methyl-N-chlorophenylmaleimide). Among these, use of maleic anhydride is preferable in view of availability, polymerization speed, and facility of molecular weight adjustment. Further, these maleic acids may be used alone or in combination of two or more kinds thereof. As described above, the maleic acid is neutralized by an alkali salt, and the generated carboxylic acid and carboxylate is a form of 1,2-dicarboxylic acid or a salt. This form has a function of trapping heavy metals eluted from the positive electrode The content ratio of the above structural units in the copolymer of the present embodiment is preferably such that (A)/(B) is within a range of 1/1 to 1/3 in a molar ratio. This is because the above range gives advantages of hydrophilicity, water-solubility, and affinity to metals or ions as a polymer body that is dissolved into water. In particular, the molar ratio of (A)/(B) is preferably 1/1 or a value near to this. In this case, the copolymer has a structure in which the unit based on the α-olefin, that is, the unit represented by —$CH_2CR^1R^2$— and the unit based on the maleic acid are alternately repeated.

The loading mixing ratio of the α-olefin and the maleic acid for obtaining the copolymer of the present embodiment may change in accordance with the composition of the intended copolymer; however, it is effective to use the α-olefin in a molar number being one to three times as large as the molar number of the maleic acid, in order to enhance the reaction ratio of the maleic acid.

A method for producing the copolymer of the present embodiment is not particularly limited and, for example, the copolymer can be obtained by radical polymerization. At that time, the polymerization catalyst to be used is preferably an azo catalyst such as azobisisobutyronitrile or 1,1-azobiscyclohexane-1-carbonitrile, or an organic peroxide catalyst such as benzoyl peroxide or dicumyl peroxide. The amount of use of the polymerization catalyst needs to be within a range of 0.1 to 5 mol % relative to the maleic acid, and a preferable range is 0.5 to 3 mol %. As a method for adding the polymerization catalyst and the monomer, these may be added in a lump at an initial stage of polymerization;

however, it is preferable to adopt a method in which these are sequentially added in accordance with the progression of polymerization.

In the method for producing the copolymer of the present embodiment, adjustment of the molecular weight can be suitably carried out mainly in accordance with monomer concentration, amount of use of the catalyst, and the polymerization temperature. For example, the molecular weight of the copolymer can be adjusted by adding a salt or hydroxide of a Group I, II, or III metal or a halide of a Group IV metal in the periodic table, a nitrogen compound such as an amine represented by the general formula N≡, HN═, $H_2N$—, or $H_4N$—, ammonium acetate, or urea, or a mercaptan as a substance that lowers the molecular weight at an early stage of polymerization or during the progress of polymerization. The polymerization temperature is preferably 40° C. to 150° C., more preferably within a range of 60° C. to 120° C. in particular. If the polymerization temperature is too high, the copolymer to be generated is liable to have a block shape, and there is a fear that the polymerization pressure becomes considerably high. Typically, the polymerization time is preferably about 1 to 24 hours, more preferably 2 to 10 hours. The amount of use of the polymerization catalyst is preferably adjusted so that the concentration of the copolymer to be obtained is 5 to 40 wt %, more preferably 10 to 30 wt %.

As described above, the copolymer of the present embodiment preferably has an average molecular weight of typically 10,000 to 500,000. A more preferable average molecular weight is 15,000 to 450,000. If the average molecular weight of the copolymer of the present embodiment is less than 10,000, the crystallinity is high, raising a fear that the adhesive strength between the particles may be weak. On the other hand, if the weight-average molecular weight exceeds 500,000, the solubility into water or solvent decreases, and the copolymer may be easily deposited in some cases.

The average molecular weight of the copolymer of the present embodiment can be determined, for example, by the tight scattering method or the viscosity method. When the limiting viscosity ($[\eta]$) in dimethylformamide is measured by using the viscosity method, the copolymer of the present embodiment preferably has a limiting viscosity within a range of 0.05 to 1.5. The copolymer of the present embodiment is typically obtained in a powder form with a uniform size of about 16 to 60 mesh.

In the present embodiment, the neutralized salt of the copolymer is preferably a neutralized product obtained by reaction of active hydrogen of the carbonyl acid generated from the maleic acid with a basic substance to form a salt. In the neutralized product of the α-olefin-maleic acid copolymer used in the present embodiment, it is preferable to use a basic substance containing a monovalent metal and/or ammonia as the basic substance in view of the binding property as a binder.

The degree of neutralization is not particularly limited. Typically, however, when the binder composition is used as a binder, it is preferable to use the binder composition in which the degree of neutralization is within a range of 0.3 to 1 mol, more preferably within a range of 0.4 to 1 mol, relative to 1 mol of the carboxylic acid generated from the maleic acid, in consideration of reactivity with the electrolytic solution. Such a degree of neutralization enables adjustment of the pH of the binder composition of the present embodiment to be within a predetermined range, and further provides an advantage of lowering the degree of acidity and suppressing decomposition of the electrolytic solution.

In the present embodiment, the degree of neutralization can be determined by using a method such as titration with a base, infrared spectrum, or NMR spectrum. In order to determine the point of neutralization conveniently and precisely, it is preferable to perform titration with a base. A specific method of titration is not particularly limited; however, the titration can be carried out by dissolving into water having less impurity, such as ion-exchange water, and performing neutralization with a basic substance such as lithium hydroxide, sodium hydroxide, or potassium hydroxide. An indicator for the point of neutralization is not particularly limited; however, an indicator that indicates pH with a base, such as phenolphthalein, can be used.

In the present embodiment, the amount of use of the basic substance containing a monovalent metal and/or ammonia is not particularly limited and is suitably selected in accordance with the purpose of use or the like; however, typically, the amount is preferably 0.1 to 2 mol per one mol of the maleic acid unit in the maleic acid copolymer. It is considered that such an amount of use allows adjustment of the pH in the binder composition of the present embodiment to a predetermined range. A water-soluble copolymer salt with less amount of residual alkali can be obtained when the amount of use of the basic substance containing a monovalent metal is set to be preferably 0.6 to 2.0 mol, more preferably 0.7 to 2.0 mol, per one mol of the maleic acid unit in the maleic acid copolymer.

The reaction of the α-olefin-maleic acid copolymer with the basic substance containing a monovalent metal and/or ammonia can be performed in accordance with a conventional method; however, a method in which the reaction is performed in the presence of water to obtain the neutralized product of the α-olefin-maleic acid copolymer as an aqueous solution is convenient and preferable.

Examples of the basic substance containing a monovalent metal that can be used in the present embodiment include hydroxides of an alkali metal such as sodium hydroxide, potassium hydroxide, and lithium hydroxide; carbonates of an alkali metal such as sodium carbonate and potassium carbonate; acetates of an alkali metal such as sodium acetate and potassium acetate; and phosphates of an alkali metal such as trisodium phosphate. Examples of the amine such as ammonia include primary amines such as ammonia, methylamine, ethylamine, butylamine, and octylamine, secondary amines such as dimethylamine diethylamine, and dibutylamine, tertiary amines such as trimethylamine, triethylamine, and tributylamine, and polyamines such as ethylenediamine, butylenediamine, diethyleneimine, triethyleneimine, and polyethyleneimine. Among these, ammonia, lithium hydroxide, sodium hydroxide, and potassium hydroxide are preferable. In particular, use of ammonia or lithium hydroxide is preferable as a binder for lithium ion secondary batteries. The basic substance containing a monovalent metal and/or ammonia may be used alone or in combination of two or more kinds thereof. Further, within a range that does not give adverse effects on the battery performance, a basic substance containing a hydroxide or the like of an alkali metal such as sodium hydroxide may be used in combination to prepare the neutralized product of the α-olefin-maleic acid copolymer.

Next, the binder composition of the present embodiment further contains a polyamine. Incorporation of the polyamine can impart toughness to the binder composition.

The polyamine used in the present embodiment is not particularly limited as long as the polyamine is electrochemically stable. The polyamine may be, for example, a low molecular compound having a molecular weight of less than 300 and/or a high molecular compound having a molecular weight of 300 or more.

Specific examples of the polyamine low molecular compound include ammonia, ammonium salts, aliphatic monoamines, aromatic monoamines, heterocyclic monoamines, aliphatic polyamines, aromatic polyamines, and heterocyclic polyamines. Specific preferable examples thereof include ammonia; ammonium salts such as tetraethylammonium hydroxide; aliphatic monoamines such as ethylamine, monoethanolamine, diethylamine, triethylamine, glycine, and guanidine carbonate; aromatic monoamines such as aniline and benzylamine; heterocyclic monoamines such as imidazole; aliphatic polyamines such as ethylenediamine, hexamethylenediamine, diethylenetriamine, triethylenetramine, and guanidine; aromatic polyamines such as phenylenediamine; and heterocyclic polyamines such as piperazine and N-aminoethylpiperazine.

Specific examples of the polyamine high molecular compound include amino group-containing polymers. Specific preferable examples thereof include polyethyleneimine, polytetramethyleneimine, polyvinylamine, polyallylamine, dicyandiamide-formalin condensate, and dicyandiamide-alkylene (polyamine) condensate. These may be used either alone or in a plurality. Use of polyethyleneimine is preferable in view of availability and economic performance.

The molecular weight of these amines is not particularly limited, and an average molecular weight is preferably within a range of 50 to 200000, more preferably within a range of 100 to 180000, and most preferably within a range of 200 to 100000. The amount of addition of the polyamine is not particularly limited; however, the amount is typically within a range of 0.01 parts by weight to 10 parts by weight, more preferably 0.05 parts by weight to 6 parts by weight, relative to 100 parts by weight of the α-olefin-maleic acid copolymer (solid components). If the amount of addition is too large, a complex salt with the α-olefin-maleic acid copolymer is formed to cause gelation, so that it is not preferable. If the amount of addition is too small, the toughness cannot be imparted, so that it is not preferable.

In the present embodiment, the polyamine can be added simultaneously with the reaction of the α-olefin-maleic acid copolymer with the basic substance containing a monovalent metal, or alternatively, the polyether can be added after the reaction of the α-olefin-maleic acid copolymer with the basic substance containing a monovalent metal.

Next, in the present embodiment, the ring-opening ratio of the copolymer refers to the ratio of hydrolysis of the maleic anhydride site that is polymerized with the α-olefin when maleic anhydride is used as the maleic acid. In the copolymer of the present embodiment, a preferable ring-opening ratio is 60 to 100%, more preferably 70% to 100%, and still more preferably 80 to 100%. If the ring-opening ratio is too low, the structural degree of freedom of the copolymer decreases, and the copolymer comes to have a deficient extension/contraction property, thereby disadvantageously raising a fear that the force of bonding the electrode material particles may become smaller. Furthermore, there is a fear of raising a problem such that the affinity to water is low and the solubility is deficient. For the ring-opening ratio, the ratio can be determined, for example, by measuring the hydrogen at the α-position of the ring-opened maleic acid with $^1$H-NMR using the hydrogen located at the α-position of the maleic acid as a standard, or the ratio can be determined by IR measurement of the carbonyl group of the maleic acid and the carbonyl group deriving from the ring-opened maleic anhydride.

Also, in the present embodiment, when the maleic acid is maleic anhydride, the neutralized salt of the copolymer is a neutralization product obtained by reaction of active hydrogen of the carbonyl acid generated from the ring opening of maleic anhydride with the basic substance as described above to form a salt. The degree of neutralization in this case is not particularly limited. Typically, however, when the binder composition is used as the binder, it is preferable to use the binder composition in which the degree of neutralization is within a range of 0.5 to 1 mol, more preferably within a range of 0.6 to 1 mol, relative to one mol of the carbonyl acid generated from the ring opening, in consideration of reactivity with the electrolytic solution. Such a degree of neutralization provides an advantage of lowering the degree of acidity and suppressing decomposition of the electrolytic solution. The degree of neutralization of the copolymer in the case of using maleic anhydride can be measured by a method similar to the one described above.

The binder composition of the present embodiment is typically used as an aqueous solution of a non aqueous electrolyte battery binder composed of the binder composition described above and water. Also, the binder composition of the present embodiment may be in a hydrogel form. In the present embodiment, the hydrogel form refers to a state in which the binder resin (polymer) has a three-dimensional network structure and is a swollen body containing water in the inside of the network structure.

Also, the non aqueous electrolyte battery binder composition according to the present embodiment is typically preferably used as a non aqueous electrolyte battery slurry composition (which may hereafter be simply referred to as slurry composition) that further contains an active material and water in addition to the binder composition described above.

Also, in the present embodiment, the non aqueous electrolyte battery negative electrode is characterized by being formed in such a manner that a mixed layer containing at least the binder composition according to the present embodiment and an active material is bound to a current collector. This negative electrode can be formed by applying the slurry composition described above onto a current collector and thereafter removing the solvent by a method such as drying. A thickening agent, an electroconductive auxiliary agent, and the like may be further added into the mixed layer in accordance with the needs.

Typically, in the non aqueous electrolyte battery slurry composition, the amount of use of the neutralized salt of the α-olefin-maleic acid copolymer relative to 100 parts by weight of the active material is preferably 0.1 to 4 parts by weight, more preferably 0.3 to 3 parts by weight, and still more preferably 0.5 to 2 parts by weight. If the amount of the copolymer is excessively small, the viscosity of the slurry is too low, thereby raising a fear that the thickness of the mixed layer may be thin. Conversely, if the amount of the copolymer is excessively large, there is a possibility that the discharge capacity may decrease.

On the other hand, typically, the amount of water in the slurry composition relative to 100 parts by weight of the active material is preferably 40 to 150 parts by weight, more preferably 70 to 130 parts by weight.

Examples of the solvent in the negative electrode slurry composition according to the present embodiment include, besides water, alcohols such as methanol, ethanol, propanol, and 2-propanol, cyclic ethers such as tetrahydrofuran and 1,4-dioxane, amides such as N,N-dimethylformamide and N,N-dimethylacetamide, cyclic amides such as N-methylpyrrolidone and N-ethylpyrrolidone, and sulfoxides such as dimethyl sulfoxide. Among these, use of water is preferable in view of safety.

Also, besides water, as a solvent of the negative electrode slurry composition according to the present embodiment, an organic solvent mentioned below may be used in combination within a range of preferably 20 wt % or less relative to the total amount of the solvent. Such an organic solvent is preferably one having a boiling point at an ordinary pressure of 100° C. or higher to 300° C. or lower, and examples thereof include organic dispersion media such as hydrocarbons such as n-dodecane; alcohols such as 2-ethyl-1-hexanol and 1-nonanol; esters such as γ-butyrolactone and methyl lactate; amides such as N-methylpyrrolidone, N,N-dimethylacetamide, and dimethylformamide; sulfoxides-sulfones such as dimethyl sulfoxide and sulfolane.

When the slurry composition of the present embodiment is used for negative electrodes, examples of the negative electrode active material (which may hereafter be abbreviated as active material) that is added to the negative electrode slurry composition include carbonaceous materials such as amorphous carbon, hard carbon (HC), graphite, natural graphite, mesocarbon microbeads (MCMB), and pitch-based carbon fibers; electroconductive polymers such as polyacene; composite metal oxides and other metal oxides represented by $SiO_x$, $SnO_x$, and $LiTiO_x$ and lithium-based metals such as lithium metal and lithium alloys; and metal compounds such as $TiS_2$ and $LiTiS_2$.

In the present embodiment, a thickening agent may be further added into the slurry composition in accordance with the needs. The thickening agent that can be added is not particularly limited, and various kinds of alcohols, particularly polyvinyl alcohol and modified products thereof, celluloses, and polysaccharides such as starch can be used.

The amount of use of the thickening agent that is blended into the slurry composition in accordance with the needs relative to 100 parts by weight of the negative electrode active material is preferably about 0.1 to 4 parts by weight, more preferably 0.3 to 3 parts by weight and still more preferably 0.5 to 2 parts by weight. If the amount of the thickening agent is excessively small, the viscosity of the secondary battery negative electrode slurry is too low, and the thickness of the mixed layer may be thin in some cases. Conversely, if the amount of the thickening agent is excessively large, the discharge capacity may decrease in some cases.

Also, the electroconductive auxiliary agent that is blended into the slurry composition in accordance with the needs may be, for example, a metal powder, an electroconductive polymer, acetylene black, or the like. Typically, the amount of use of the electroconductive auxiliary agent relative to 100 parts by weight of the negative electrode active material is preferably 0.5 to 10 parts by weight, more preferably 1 to 7 parts by weight.

The current collector used in the non aqueous electrolyte battery negative electrode of the present embodiment is not particularly limited as long as the current collector is made of an electroconductive material and, for example, metal materials such as iron, copper, aluminum, nickel, stainless steel, titanium, tantalum, gold, and platinum can be used. These may be used alone or in combination of two or more kinds thereof at an arbitrary ratio.

In particular, when copper is used as the negative electrode, the effect of the non aqueous electrolyte battery negative electrode slurry of the present invention is most conspicuous. The shape of the current collector is not particularly limited; however, typically, the current collector is preferably in a sheet form having a thickness of about 0.001 to 0.5 mm.

A method for applying the slurry onto the current collector is not particularly limited. For example, the method may be the doctor blade method, the dipping method, the reverse roll method, the direct roll method, the gravure method, the extrusion method, the immersion method, the brush coating method, or the like. The amount of applying the slurry is not also particularly limited; however, the amount is generally such that the thickness of the mixed layer containing the active material, the electroconductive auxiliary agent, the binder, and the thickening agent formed after removal of the solvent or dispersion medium by a method such as drying is preferably 0.005 to 5 mm, more preferably 0.01 to 2 mm.

A method of drying the solvent such as water contained in the slurry composition is not particularly limited and may be, for example, aeration drying by warm air, hot air, or low-humidity air, vacuum drying; radiation drying by infrared rays, far infrared rays, or electron beams; or the like. The drying conditions are preferably adjusted so that the solvent can be removed as quickly as possible within a speed range such that cracks may not be generated in the active material layer by stress concentration or the active material layer may not be peeled off from the current collector. Further, it is effective to press the current collector after drying in order to increase the density of the active material of the electrode. A pressing method may be, for example, mold pressing, roll pressing, or the like.

Furthermore, the scope of the present invention includes a non aqueous electrolyte battery having the negative electrode described above. The non aqueous electrolyte battery typically includes the aforementioned negative electrode, a positive electrode, and an electrolytic solution.

In the present embodiment, as the positive electrode, a positive electrode typically used in non aqueous electrolyte batteries such as lithium ion secondary batteries can be used without any particular limitation. For example, a transition metal oxide such as $TiS_2$, $TiS_3$, amorphous $MoS_3$, $Cu_2V_2O_3$, amorphous $V_2O$—$P_2O_5$, $MoO_3$, $V_2O_5$, or $V_6O_{13}$, a lithium-containing composite metal oxide such as $LiCoO_2$, $LiNiO_2$, $LiMnO_2$, or $LiMn_2O_4$, or the like is used as the positive electrode active material. Also, the positive electrode can be produced, for example, by applying a positive electrode slurry, which is prepared by mixing a positive electrode active material with an electroconductive auxiliary agent similar to that of the aforementioned negative electrode and a binder such as SBR, NDR, acrylic rubber, hydroxyethyl cellulose, carboxymethyl cellulose, or polyvinylidene fluoride into water or the aforementioned solvent having a boiling point at an ordinary pressure of 100° C. or higher to 300° C. or lower, onto a positive electrode current collector such as aluminum, and drying the solvent.

Also, in the non aqueous electrolyte battery of the present embodiment, an electrolytic solution obtained by dissolving an electrolyte into a solvent can be used. The electrolytic solution may be either in a liquid form or in a gel form as long as the electrolytic solution is one used in an ordinary non aqueous electrolyte battery such as a lithium ion secondary battery, and an electrolytic solution exhibiting a function as a battery in accordance with the types of the negative electrode active material and the positive electrode active material may be suitably selected. As a specific electrolyte, for example, all lithium salts conventionally known can be used, and examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and lower aliphatic carboxylic acid lithium.

The solvent into which such an electrolyte is dissolved (electrolytic solution solvent) is not particularly limited. Specific examples thereof include carbonates such as propylene carbonate, ethylene carbonate, butylene carbonate, dimethyl carbonate, and diethyl carbonate; lactones such as γ-butyrolactone; ethers such as trimethoxymethane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile and nitromethane; organic acid esters such as methyl formate, methyl acetate, ethyl acetate, butyl acetate, methyl propionate, and ethyl propionate; inorganic acid esters such as triethyl phosphate, dimethyl carbonate, and diethyl carbonate; diglymes; triglymes; sulfolanes; oxazolidinones such as 3-methyl-2-oxazolidinone; and sultones such as 1,3-propanesultone, 1,4-butanesultone, and naphthasultone. These may be used alone or in combination of two or more kinds thereof. When an electrolytic solution in a gel form is used, a nitrile-based polymer, an acryl-based polymer, a fluorine-based polymer, an alkylene oxide-based polymer, or the like can be added as a gelling agent.

A method for producing the non aqueous electrolyte battery of the present embodiment is not particularly limited and, for example, the following production method can be exemplified. That is, a negative electrode and a positive electrode are superposed with a separator such as a polypropylene porous membrane interposed therebetween, and the resultant is put into a battery container after being subjected to winding, folding, or the like in accordance with the shape of the battery, followed by injecting an electrolytic solution and sealing. The shape of the battery may be any of a known coin type, button type, sheet type, cylindrical type, prismatic type, and flat type.

The non aqueous electrolyte battery of the present embodiment is a battery in which adhesion and improvement of the battery characteristics are compatible with each other, so that the battery is useful for various purposes. For example, the battery of the present embodiment is extremely useful also as a battery used in portable terminals in which scale reduction, thickness reduction, weight reduction, and performance enhancement are demanded.

As described above, the present specification discloses techniques in various modes. Among these, principal techniques are summarized as follows.

That is, a non aqueous electrolyte battery binder composition (which may hereafter be simply referred to as a binder composition) according to one aspect of the present invention is characterized by containing a polyamine and a neutralized salt of an α-olefin-maleic acid copolymer in which an α-olefin and maleic acid are copolymerized.

It is considered that, by such a configuration, an improvement in the battery characteristics can be achieved without deteriorating the binding property between the active materials and to the current collector electrode and the toughness as the electrode.

An aqueous solution of a non aqueous electrolyte battery binder according to another aspect of the present invention is characterized by being composed of the binder composition mentioned above and water.

A non aqueous electrolyte battery slurry composition according to still another aspect of the present invention is characterized by containing the binder composition mentioned above, an active material, and a solvent.

A non aqueous electrolyte battery negative electrode according to still another aspect of the present invention is characterized in that a mixed layer containing at least the non aqueous electrolyte battery binder composition mentioned above and an active material is bound to a current collector.

A non aqueous electrolyte battery according to still another aspect of the present invention is characterized by having the non aqueous electrolyte battery negative electrode mentioned above, a positive electrode, and an electrolytic solution.

EXAMPLES

Hereafter, Examples of the present invention will be described; however, the present invention is not limited to these Examples.

Example 1

<Negative Electrode Binder Composition>

As the negative electrode binder composition, a 10 wt % aqueous solution of a water-soluble lithium modified isobutene-maleic anhydride copolymer resin (average molecular weight of 325,000, degree of neutralization of 0.5, and ring-opening ratio of 96%) was prepared. Further, as the polyamine, a 10 wt % aqueous solution of polyethyleneimine (PEI, manufactured by Wako Pure Chemical Industries, Ltd., average molecular weight of 600) was prepared and mixed so as to attain a weight ratio of 10 wt % aqueous solution of resin:10 wt % aqueous solution of PEI=99:1 (resin:PEI=6.387:0.065 as solid components).

<Preparation of Negative Electrode Slurry>

Preparation of electrode slurry was carried out in the following manner With respect to 100 parts by weight of natural graphite (DMGS, manufactured by BYD Co.) serving as a negative electrode active material, a 10 wt % aqueous solution of the negative electrode binder composition at 6.452 parts by weight in terms of solid components and Super-P (manufactured by TIMCAL Ltd.) serving as an electroconductive auxiliary agent (electroconductivity imparting agent) at 1.075 parts by weight in terms of solid components were put into an exclusive-use container, followed by kneading with use of a planetary stirrer (ARE-250, manufactured by Thinky Corporation). For adjustment of slurry viscosity, water was added during the kneading, and the kneading was carried out again, so that a slurry for electrode coating was prepared. The composition ratio of the active material and the binder in the slurry was graphite powder:electroconductive auxiliary agent:binder composition=100:1.075:6.452 in terms of solid components.

<Preparation of Negative Electrode for Batteries>

The obtained slurry was applied onto a copper foil (CST8Q manufactured by Fukuda Metal Foil & Powder Co., Ltd.) of a current collector with use of a bar coater (T101, manufactured by Matsuo Sangyo Co., Ltd.), and primary drying was carried out at 80° C. for 30 minutes with use of a hot air dryer (manufactured by Yamato Scientific Co., Ltd.), followed by performing a rolling treatment with use of a roll press (manufactured by Hohsen Corp.). Thereafter, a battery electrode (φ14 mm) was stamped out from the resulting product, and subsequently, an electrode for coin batteries was prepared by secondary drying at 120° C. for 3 hours under reduced-pressure conditions.

<Toughness Test of Electrode>

Evaluation of the toughness of the electrode was carried out by using a type-1 test apparatus of JIS K5600-5-1

(Testing methods for paints-Part 5: Mechanical property of film-Section 1: Bending test (cylindrical mandrel)). Confirmation of electrode cracks was carried out by eye inspection, and the result of the minimum mandrel diameter at which cracks were not generated is shown in the following Table 1. The smaller the mandrel diameter is, the higher the toughness is. When the mandrel diameter is 5 mm or less, the product is preferable for use as the electrode.

<Measurement of Peeling Strength of Electrode>

The strength at which the electrode was peeled off from the copper foil serving as the current collector electrode was measured. As the peeling strength, the 180° peeling strength was measured by using a Load Cell of 50 N (manufactured by Imada Co., Ltd.). The slurry-coated surface of the coated electrode for batteries obtained in the above was bonded onto a stainless steel plate with use of a two-sided tape (two-sided tape manufactured by Nichiban Co., Ltd.), and the 180° peeling strength (peeling width of 10 mm, peeling speed of 100 mm/min) was measured. The above results are shown in the following Table 1.

<Preparation of Battery>

The coated electrode for batteries obtained in the above was transferred to a glove box (manufactured by MIWA MFG Co., Ltd.) disposed in an argon gas atmosphere. A metal lithium foil (having a thickness of 0.2 mm, φ16 mm) was used as a positive electrode. A polypropylene-based membrane (Celgard #2400, manufactured by Polypore) was used as a separator, and a solution of lithium hexafluorophosphate ($LiPF_6$) in a mixed solvent obtained through addition of vinylene carbonate (VC) into ethylene carbonate (EC) and ethyl methyl carbonate (EMC) (1M-$LiPF_6$, EC/EMC=3/7 vol %, VC of 2 wt %) was used as an electrolytic solution and injected, so that a coin battery (2032 type) was prepared.

<Evaluation Method: Charge/Discharge Characteristics Test>

The prepared coin battery was subjected to charge/discharge test with use of a commercially available charge/discharge tester (TOSCAT3100, manufactured by Toyo System Co., Ltd.). The coin battery was placed in a thermostat of 25° C. and, for charging, constant-current charging of 0.1 C (about 0.5 mA/cm²) relative to the active material amount was carried out until 0 V was attained relative to the electric potential of lithium, and further, constant-voltage charging of 0 V was carried out until 0.02 mA was attained relative to the electric potential of lithium. The capacity at that time was determined as a charge capacity (mAh/g). Subsequently, constant-current discharging of 0.1 C (about 0.5 mA/cm²) was carried out down to 1.5 V relative to the electric potential of lithium, and the capacity at that time was determined as a discharge capacity (mAh/g). The difference between the initial discharge capacity and the charge capacity was determined as an irreversible capacity, and the percentage of discharge capacity/charge capacity was determined as charge/discharge efficiency. For the direct current resistance of the coin battery, a resistance value after charging was carried out once (fully charged state) was adopted. The above results are shown in the following Table 1.

Example 2

A 10 wt % aqueous solution of the resin used in Example 1 and a 10 wt % aqueous solution of polyethyleneimine (PEI, manufactured by Wako Pure Chemical Industries, Ltd., average molecular weight of 1200) serving as the polyamine were prepared and mixed so as to attain a ratio of 10 wt % aqueous solution of resin:10 wt % aqueous solution of PEI=99:1 (resin:PEI=6.387:0.065 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 3

A 10 wt % aqueous solution of the resin used in Example 1 and a 10 wt % aqueous solution of polyethyleneimine (PEI, manufactured by Wako Pure Chemical Industries, Ltd., average molecular weight of 10000) serving as the polyamine were prepared and mixed so as to attain a ratio of 10 wt % aqueous solution of resin:10 wt % aqueous solution of PEI=99:1 (resin:PEI=6.387:0.065 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 4

A 10 wt % aqueous solution of the resin used in Example 1 and a 10 wt % aqueous solution of polyethyleneimine (PEI, manufactured by Wako Pure Chemical Industries Ltd., average molecular weight of 1200) serving as the polyamine were prepared and mixed so as to attain a ratio of 10 wt % aqueous solution of resin:10 wt % aqueous solution of PEI=99.5:0.5 (resin:PEI=6.419:0.032 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 5

A 10 wt % aqueous solution of the resin used in Example 1 and a 10 wt % aqueous solution of polyethyleneimine (PEI, manufactured by Wako Pure Chemical Industries, Ltd., average molecular weight of 1200) serving as the polyamine were prepared and mixed so as to attain a ratio of 10 wt % aqueous solution of resin:10 wt % aqueous solution of PEI=95:5 (resin:PEI=6.129:0.323 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 6

As the negative electrode binder composition, a 10 wt % aqueous solution of a water-soluble lithium modified methyl vinyl ether-maleic anhydride copolymer resin (average molecular weight of 630,000, degree of neutralization of 0.5, and ring-opening ratio of 96%) was prepared. Further, a 10 wt % aqueous solution of polyethyleneimine (PEI, manufactured by Wako Pure Chemical Industries, Ltd., average molecular weight of 1200) serving as the polyamine was prepared and mixed so as to attain a ratio of 10 wt % aqueous solution of resin:10 wt % aqueous solution of PEI=99:1 (resin:PEI=6.387:0.065 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 7

As the negative electrode binder composition, a 10 wt % aqueous solution of a water-soluble lithium modified ethylene-maleic anhydride copolymer resin (average molecular weight of 100,000 to 600,000, degree of neutralization of 0.5, and ring-opening ratio of 96%) was prepared. Further, a 10 wt % aqueous solution of polyethyleneimine (PEI, manufactured by Wako Pure Chemical Industries, Ltd., average molecular weight of 1200) serving as the polyamine was prepared and mixed so as to attain a ratio of 10 wt % aqueous solution of resin:10 wt % aqueous solution of PEI=99:1 (resin:PEI=6.387:0.065 as solid components). A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Example 8

<Preparation of Active Material (Hard Carbon)>

A coconut shell was crashed and subjected to dry distillation at 500° C. to obtain a coconut shell char having a particle size of 2.360 to 0.850 mm (containing 98 wt % of particles having a particle size of 2.360 to 0.850 mm). With respect to 100 g of this coconut shell char, a gas-phase deashing treatment was carried out at 870° C. for 30 minutes while supplying nitrogen gas containing 1 vol % of hydrogen chloride gas at a flow rate of 10 L/min. Thereafter, only the supply of hydrogen chloride gas was stopped, and further a gas-phase deacidification treatment was carried out at 900° C. for 30 minutes while supplying nitrogen gas at a flow rate of 10 L/min, so that a carbon precursor was obtained.

The obtained carbon precursor was roughly ground to have an average particle size of 10 µm with use of a hall mill, and thereafter ground and classified with use of a compact jet mill (Co-Jet System α-mkIII, manufactured by Seishin Enterprise Co., Ltd.) to obtain a carbon precursor having an average particle size of 9.6 µm. A mixture was obtained by mixing 9.1 g of this carbon precursor and 0.9 g of polystyrene (manufactured by Sekisui Plastics Co., Ltd., average particle size of 400 µm, residual carbon ratio of 1.2%). Into a sagger made of graphite (longitudinal side of 100 mm, lateral side of 100 mm, height of 50 mm). 10 g of this mixture was put and heated to 1320° C. at a heating rate of 60° C. per one minute under a nitrogen gas flow rate of 5 L per one minute in a high-speed heating furnace manufactured by Motoyama Engineering Trading Company Ltd. Thereafter, the resultant was held for 11 minutes to be subjected to natural cooling, whereby a hard carbon (HC) was prepared.

A negative electrode binder composition was obtained in the same manner as in Example 3 except that the hard carbon obtained in the above was used as an active material. Then, a non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Comparative Example 1

A 10 wt % aqueous solution of the resin used in Example 1 was prepared and used as a negative electrode binder composition. A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Comparative Example 2

A 10 wt % aqueous solution of the resin used in Example 6 was prepared and used as a negative electrode binder composition. A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Comparative Example 3

A 10 wt % aqueous solution of the resin used in Example 7 was prepared and used as a negative electrode binder composition. A non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

Comparative Example 4

A negative electrode binder composition was obtained in the same manner as in Comparative Example 1 except that the hard carbon obtained in the above was used as an active material. Then, a non aqueous electrolyte battery slurry was prepared in the same manner as in Example 1. Further, a coated negative electrode was prepared in the same manner as in Example 1, so as to obtain a coin battery, which was subjected to a charging/discharging characteristics test. Also, with use of the coated electrode, the toughness test and the peeling strength test were carried out. The results are shown in the following Table 1.

TABLE 1

| | Resin | Active material | | Additive | | |
|---|---|---|---|---|---|---|
| | Type | Type | Amount | Type | Molecular weight | Amount |
| Example 1 | Lithium modified isobutene-maleic anhydride copolymer | Natural graphite | 100 | PEI | 600 | 0.065 |
| Example 2 | Lithium modified isobutene-maleic anhydride copolymer | Natural graphite | 100 | PEI | 1200 | 0.065 |
| Example 3 | Lithium modified isobutene-maleic anhydride copolymer | Natural graphite | 100 | PEI | 10000 | 0.065 |
| Example 4 | Lithium modified isobutene-maleic anhydride copolymer | Natural graphite | 100 | PEI | 1200 | 0.032 |
| Example 5 | Lithium modified isobutene-maleic anhydride copolymer | Natural graphite | 100 | PEI | 1200 | 0.323 |
| Example 6 | Lithium modified methyl vinyl ether-maleic anhydride copolymer | Natural graphite | 100 | PEI | 1200 | 0.065 |
| Example 7 | Lithium modified ethylene-maleic anhydride copolymer | Natural graphite | 100 | PEI | 1200 | 0.065 |
| Example 8 | Lithium modified isobutene-maleic anhydride copolymer | HC | 100 | PEI | 10000 | 0.065 |
| Comparative Example 1 | Lithium modified isobutene-maleic anhydride copolymer | Natural graphite | 100 | None | — | 0 |
| Comparative Example 2 | Lithium modified methyl vinyl ether-maleic anhydride copolymer | Natural graphite | 100 | None | — | 0 |
| Comparative Example 3 | Lithium modified ethylene-maleic anhydride copolymer | Natural graphite | 100 | None | — | 0 |
| Comparative Example 4 | Lithium modified ethylene-maleic anhydride copolymer | HC | 100 | None | — | 0 |

| | Effect | | | | | | |
|---|---|---|---|---|---|---|---|
| | Minimum mandrel diameter (mm) | Peeling strength (N/m) | Charge capacity (mAh/g) | Discharge capacity (mAh/g) | Irreversible capacity (mAh/g) | Charge/discharge efficiency (%) | Direct current resistance (Ω) |
| Example 1 | 2 or less | 36 | 390 | 361 | 29 | 92.6 | 148 |
| Example 2 | 2 or less | 35 | 394 | 361 | 33 | 91.7 | 149 |
| Example 3 | 2 or less | 40 | 381 | 351 | 30 | 92.0 | 150 |
| Example 4 | 2 or less | 30 | 397 | 365 | 35 | 91.9 | 144 |
| Example 5 | 2 or less | 31 | 396 | 364 | 31 | 92.1 | 150 |
| Example 6 | 2 or less | 40 | 409 | 374 | 35 | 91.5 | 155 |
| Example 7 | 2 or less | 31 | 400 | 365 | 35 | 91.3 | 149 |
| Example 8 | 2 or less | 35 | 382 | 341 | 41 | 89.3 | 112 |
| Comparative Example 1 | 12 | 25 | 393 | 363 | 30 | 92.3 | 144 |
| Comparative Example 2 | 10 | 29 | 409 | 373 | 35 | 91.4 | 155 |
| Comparative Example 3 | 10 | 20 | 403 | 369 | 34 | 91.6 | 148 |
| Comparative Example 4 | 15 | 16 | 380 | 332 | 48 | 87.4 | 151 |

(Studies)

In Examples 1 to 8 in which a polyamine was contained in the negative electrode binder composition, improvement in the toughness and the adhesion property was seen due to the effect of cross-linking caused by formation of a salt with acid. Further, as will be clear from Table 1, in the Examples pertaining to the present invention, it was shown that, even when a polyamine is added, the battery characteristics are not largely affected, and resistance reduction is achieved.

In contrast, in Comparative Examples 1 to 4 in which a polyamine was not contained, both the toughness and the adhesion property were found to be low as a result.

This application is based on Japanese Patent Application No. 2015-158268 filed on Aug. 10, 2015, and the contents thereof are incorporated in the present application.

In order to express the present invention, the present invention has been appropriately and fully described by way of embodiments with reference to the drawings and the like in the above: however, it is to be recognized that those skilled in the art can readily make changes and/or modifications on the above-described embodiments. Therefore, it is to be interpreted that the changed modes or modified modes carried out by those skilled in the art are encompassed within the scope of the rights of the claims unless those changed modes or modified modes are at a level that departs from the scope of the rights of the claims as given in the claims section of the present specification.

INDUSTRIAL APPLICABILITY

The present invention has an industrial applicability in a wide range in the technical field of non aqueous electrolyte batteries.

The invention claimed is:

1. An aqueous solution of a non aqueous electrolyte battery binder composed of water and a non aqueous electrolyte battery binder composition, wherein the binder composition comprises a polyamine and a neutralized salt of an α-olefin-maleic acid copolymer obtained through copolymerization of an α-olefin and maleic acid.

2. A non aqueous electrolyte battery slurry composition comprising a non aqueous electrolyte battery binder composition, an active material, and water, wherein the binder composition comprises a polyamine and a neutralized salt of an α-olefin-maleic acid copolymer obtained through copolymerization of an α-olefin and maleic acid.

3. A non aqueous electrolyte battery negative electrode formed by binding a mixed layer containing a non aqueous electrolyte battery binder composition and an active material to a current collector, wherein the binder composition comprises a polyamine and a neutralized salt of an α-olefin-maleic acid copolymer obtained through copolymerization of an α-olefin and maleic acid.

4. A non aqueous electrolyte battery having the non aqueous electrolyte battery negative electrode according to claim 3.

* * * * *